United States Patent
Volpe

(10) Patent No.: US 10,876,757 B2
(45) Date of Patent: Dec. 29, 2020

(54) TELESCOPIC VENT

(71) Applicant: Miles Volpe, Milford, MI (US)

(72) Inventor: Miles Volpe, Milford, MI (US)

(73) Assignee: Miles Volpe, Milford, MI (US)

( * ) Notice: Subject to any disclaimer, the term of this patent is extended or adjusted under 35 U.S.C. 154(b) by 0 days.

(21) Appl. No.: 15/987,065

(22) Filed: May 23, 2018

(65) Prior Publication Data

US 2019/0338982 A1    Nov. 7, 2019

Related U.S. Application Data

(63) Continuation of application No. PCT/US2018/030362, filed on May 1, 2018.

(51) Int. Cl.
| | |
|---|---|
| *F24F 13/20* | (2006.01) |
| *F24F 13/02* | (2006.01) |
| *F16L 25/10* | (2006.01) |
| *F24F 13/12* | (2006.01) |

(52) U.S. Cl.
CPC .......... *F24F 13/0209* (2013.01); *F16L 25/10* (2013.01); *F24F 13/0245* (2013.01); *F24F 13/12* (2013.01)

(58) Field of Classification Search
CPC ............................ F24F 13/0209; F24F 13/0281
USPC ........... 454/270–276, 351–356, 44, 243, 367
See application file for complete search history.

(56) References Cited

U.S. PATENT DOCUMENTS

| | | | |
|---|---|---|---|
| 3,056,397 A * | 10/1962 | Little | F24C 3/004 |
| | | | 126/85 B |
| 3,411,427 A | 11/1968 | Graham et al. | |
| 3,849,902 A | 11/1974 | Clark, Jr. et al. | |
| 4,569,110 A | 2/1986 | Goettel | |
| 4,584,986 A | 4/1986 | Cannata | |
| 4,741,391 A * | 5/1988 | Schmitz | F24F 12/00 |
| | | | 165/56 |
| 5,024,454 A | 6/1991 | McGilp et al. | |
| 5,314,212 A | 5/1994 | Sanders | |
| 5,444,947 A | 8/1995 | Miller | |
| 5,487,766 A | 1/1996 | Vannier | |
| 5,518,277 A | 5/1996 | Sanders | |
| 5,584,129 A | 12/1996 | Williamson | |
| 5,589,643 A | 12/1996 | Pyle | |
| 5,722,181 A | 3/1998 | Meyer | |

(Continued)

FOREIGN PATENT DOCUMENTS

| | | |
|---|---|---|
| DE | 102006053208 B4 | 5/2008 |
| GB | 1256231 A | 12/1971 |

(Continued)

OTHER PUBLICATIONS

Engless translation Abstract of japanies documents JP05071797A and JP61197926A.*

(Continued)

*Primary Examiner* — Helena Kosanovic

(74) *Attorney, Agent, or Firm* — Carlson, Gaskey & Olds, P.C.

(57) ABSTRACT

A vent includes a sleeve with a flange. The flange is nearer to one end of the sleeve than another. A tube is receivable in the first end of the sleeve and fits the tube fits the sleeve in a way that creates an effectively continuous duct. A vent hood is connected to the tube so the tube and sleeve create a vent with a telescopically adjustable length.

11 Claims, 5 Drawing Sheets

(56) References Cited

U.S. PATENT DOCUMENTS

| | | | |
|---|---|---|---|
| 5,921,592 A | 7/1999 | Donnelly | |
| 5,975,146 A | 11/1999 | Lardillat et al. | |
| 6,302,788 B1 * | 10/2001 | Gagnon | D06F 58/20 |
| | | | 454/359 |
| 6,370,794 B1 | 4/2002 | Tuggle | |
| 6,682,415 B1 | 1/2004 | Vagedes | |
| 6,786,509 B2 | 9/2004 | Lang et al. | |
| 7,195,290 B2 | 3/2007 | Duffy | |
| 7,383,623 B2 | 6/2008 | Kozik | |
| 7,610,726 B2 * | 11/2009 | Lajewski | F24F 7/00 |
| | | | 248/220.21 |
| 8,721,410 B2 | 5/2014 | Friebel et al. | |
| 9,267,294 B2 | 2/2016 | Shapiro | |
| 9,541,222 B2 | 1/2017 | Shinners | |
| 9,689,108 B2 | 6/2017 | Hamman, Jr. et al. | |
| 9,746,107 B2 | 8/2017 | Tani et al. | |
| 2005/0116470 A1 | 6/2005 | Duffy | |
| 2006/0240763 A1 * | 10/2006 | Takeda | F24F 7/00 |
| | | | 454/270 |
| 2010/0325970 A1 | 12/2010 | Bonshor | |
| 2011/0302876 A1 * | 12/2011 | Giffin | F24F 7/02 |
| | | | 52/741.4 |
| 2015/0031282 A1 * | 1/2015 | Nagan | F24F 7/007 |
| | | | 454/329 |

FOREIGN PATENT DOCUMENTS

| | | | |
|---|---|---|---|
| JP | 61197926 A | * | 9/1986 |
| JP | 05071797 A | * | 3/1993 |
| JP | 2001-280659 A | | 10/2001 |
| JP | 2005-55126 A | | 3/2005 |
| JP | 2007-113803 A | | 5/2007 |
| JP | 2009-150610 A | | 7/2009 |
| WO | 2011/148646 A1 | | 12/2011 |

OTHER PUBLICATIONS

International Search Report and Written Opinion for PCT Application No. PCT/US18/30362 dated Sep. 14, 2018.

* cited by examiner

TELESCOPIC VENT

CROSS-REFERENCE TO RELATED APPLICATIONS

This application is a continuation of International Application No. PCT/US2018/030362 filed on May 1, 2018.

BACKGROUND

Exhaust vents are used in home and commercial construction to communicate fluid from a mechanical device such as a water heater, furnace or clothes dryer to the outside environment. A typical vent includes a duct and a hood non-adjustably affixed to one another. The duct extends through a hole in a wall of the house, and the hood is arranged at the exterior of the wall to prevent water and debris from entering the house through the vent.

In new construction, the hole is often sloppily made in the wall, which provides a large gap that must be sealed with, for example, insulating foam. The hole is usually irregular and provides excessive clearance, frequently having an approximate diameter one or two inches larger than the vent. After the foam sets the vent in place, a veneer may be built against an exterior side of the wall. The vent can be damaged or knocked out of position while the veneer is being built, and even if the vent is not knocked loose it might not fit the finished veneer well. Even if the hole is made relatively precisely, it still may be difficult to fully seal the resultant gap between the wall and the duct.

SUMMARY

In one exemplary embodiment, a vent includes a sleeve with a flange. The flange is nearer to one end of the sleeve than another. A tube is slidably receivable in the first end of the sleeve. The tube fits the sleeve in a way that creates an effectively continuous duct with an adjustable length.

In a further embodiment of the above, the tube is freely removable from the sleeve.

In a further embodiment of any of the above, a cuff extends from the sleeve to overlap the tube.

In a further embodiment of any of the above, the tube has a hood on an end opposite from an end of the tube receivable in the sleeve.

In a further embodiment of any of the above, the tube fits within the sleeve to establish a substantially continuous airway from the sleeve to the hood.

In a further embodiment of any of the above, wherein the hood has a barrier that restricts air movement through the hood in one direction.

In another exemplary embodiment, a vent includes a sleeve with a flange and a telescoping portion with an exhaust hood. The telescoping portion is slidingly receivable by the sleeve to allow manual adjustment of a distance between the hood and the sleeve.

In a further embodiment of any of the above, the telescoping portion includes a tube that fits within the sleeve to create an effectively continuous duct.

In a further embodiment of any of the above, a cuff extends from the sleeve and overlaps a radially inner surface of the telescoping portion.

In a further embodiment of any of the above, the sleeve has two ends, and one of the ends is closer to the flange than the other. The telescoping portion extends from the end closer to the flange.

In a further embodiment of any of the above, the telescoping portion is unconnected to the sleeve.

In a further embodiment of any of the above, the telescoping portion is freely removable from the sleeve.

In a further embodiment of any of the above, wherein the hood has a barrier that restricts air movement through the hood in one direction.

In another exemplary embodiment, a method of installing a vent in a building includes disposing a sleeve having a flange through a hole in a wall, anchoring the flange to the wall, and slidingly adjusting a distance that a telescoping portion extends from an exterior end of the sleeve.

In a further embodiment of the above, a veneer is installed against the side of the wall to which the flange is anchored. The veneer is installed after anchoring the flange to the wall and before slidingly adjusting the telescoping portion relative to the sleeve.

In a further embodiment of any of the above, the veneer is installed to overlap the flange.

In a further embodiment of any of the above, installing the veneer is laying brick.

In a further embodiment of any of the above, the sliding adjustment of the telescoping portion includes inserting the telescoping portion into the exterior end of the sleeve.

In a further embodiment of any of the above, the telescoping portion is inserted into the exterior end of the sleeve before installing the veneer.

In a further embodiment of any of the above, insulation is cut and folded back from around the hole before disposing the sleeve through the whole. After anchoring the flange to the wall, the insulation is unfolded to overlap the flange.

BRIEF DESCRIPTION OF THE DRAWINGS

The disclosure can be further understood by reference to the following detailed description when considered in connection with the accompanying drawings wherein.

DETAILED DESCRIPTION

Figure 1:
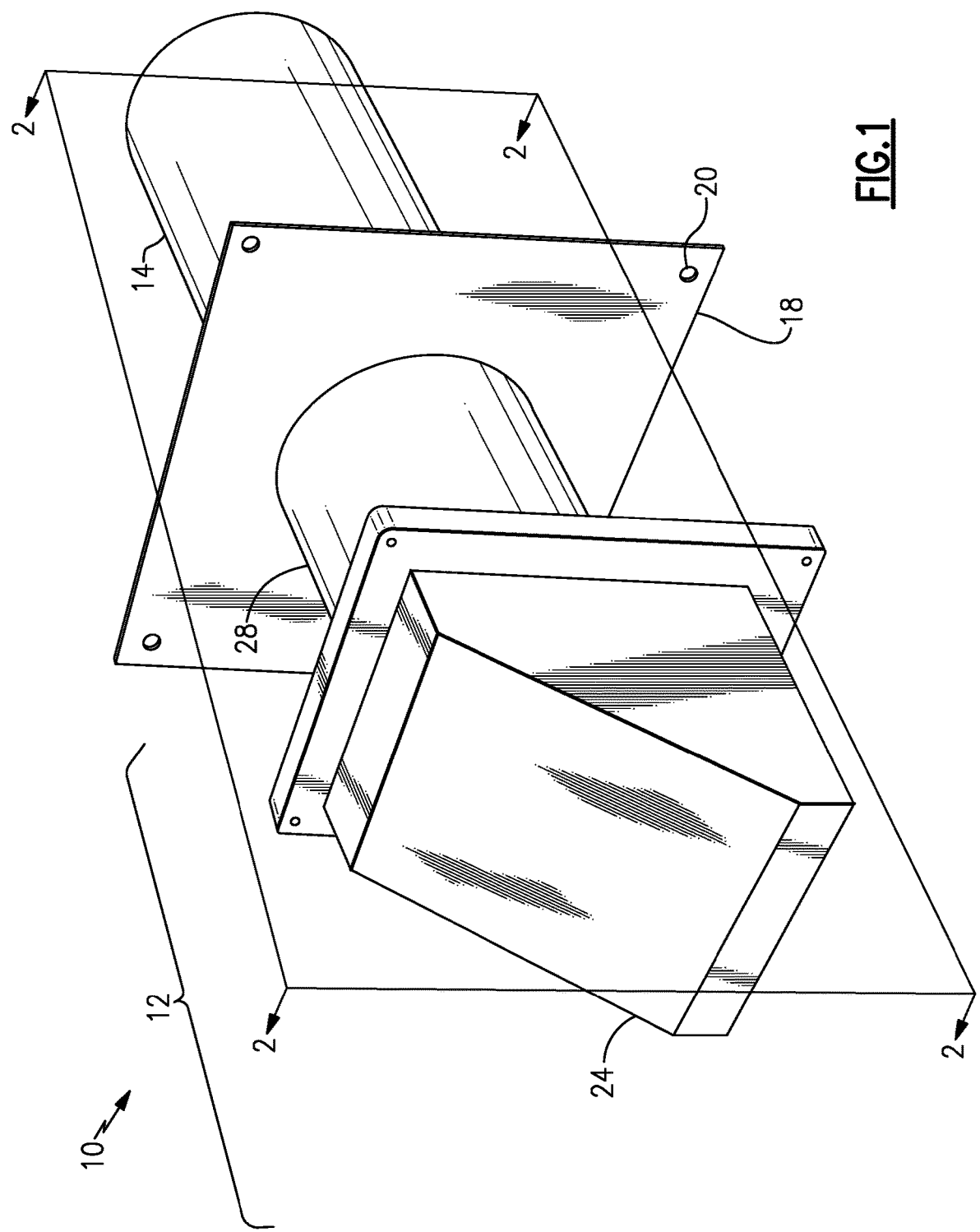
FIG. 1 illustrates a vent according to an embodiment.

Referring to FIG. 1, an exemplary telescopic vent 10 is illustrated. The vent 10 includes a telescoping portion 12 and a sleeve 14. The telescoping portion 12 as shown has a hood 24 attached to a first longitudinal end of a tube 28. In the illustrated embodiment, the hood 24 is a flapper vent hood, but other hoods are expressly contemplated.

A second longitudinal end of the tube 28 is slidingly received in the sleeve 14. A flange 18 extends radially outward from a radially exterior side of the sleeve 14. The flange 18 has several fastener holes 20, with which the flange 18 may be anchored to a wall. The flange 18 is arranged against the wall when anchored by the fastener holes 20. The flange 18 covers any gap between the hole in the building's wall and the sleeve 14, reducing air and water infiltration, especially in conjunction with the overlapping covering.

The tube 28 and sleeve 14 are both illustrated here as generally cylindrical, but it should be understood that the tube 28 or sleeve 14 might have other cross-sectional shapes. For example, the tube 28 and sleeve 14 could have roughly rectangular cross-sectional shapes.

Figure 2A:
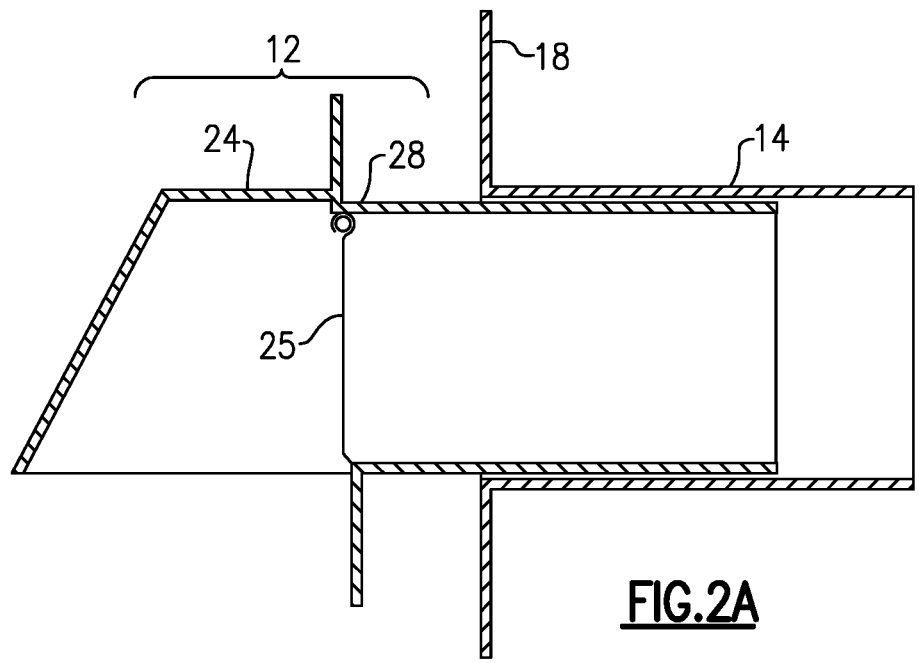
FIG. 2A is a cross-section along section 2-2.

FIG. 2A provides an approximately half sectional view of the vent 10. As shown, an exterior diameter of the tube 28 is slightly smaller than an interior diameter of the sleeve 14, making the tube 28 slidably insertable into the sleeve 14. The sliding fit of the tube 28 into the sleeve 14 allows the telescoping portion 12 to be adjusted in an axial direction relative to the sleeve 14, giving the vent 10 an adjustable length. As illustrated, the tube 28 is slidingly movable within the sleeve 14, but tubes 28 and sleeves 14 with threading or other movement restricting features also come within the scope of the disclosure. For example, the tube 28 and sleeve 14 may be threaded such that the tube 28 must be rotated or "screwed in" relative to the sleeve 14 to adjust the depth of insertion.

In some embodiments, a difference between an exterior diameter of the tube 28 and an interior diameter of the sleeve 14 small enough that the tube 28 has a slight interference fit with the sleeve 14. The interference fit can contribute to preventing weather infiltration and allows the telescoping portion 12 to resist disturbances and maintain its axial position relative to the sleeve 14 after manual inserting and adjustment. Sealing and resilient positioning can be further improved with a seal between the sleeve 14 and tube 28 such as a bead of silicone or insulating tape.

The tube 28 fits within the sleeve 14 to establish a substantially continuous airway extending through the sleeve 14 and tube 28. Here, the substantially continuous airway means a majority of an exiting airflow through the sleeve 14 will flow into the tube 28 rather than escaping out of any gap between the sleeve 14 and the tube 28. In the illustrated embodiment, the substantially continuous airway extends from the sleeve to the hood 24. Like the vent 10 as a whole, the substantially continuous airway also has an adjustable length because of the sliding fit of the tube 28 in the sleeve 14. The tube 28 and sleeve 14 create an effectively continuous duct with a manually adjustable length. In other words, the tube 28 inserted into the sleeve 14 functions comparably to a single duct of the same length for a typical building exhaust application.

The hood 24 illustrated here has a cavity within it and air exits the vent by flowing through the hood 24. The hood 24 may have features to reduce weather infiltration, prevent backflow of air, shed water, and discourage entry or nesting by animals. For example, the hood 24 may have a barrier 25 such as a flap or series of flaps installed to open in response to force in one direction but remain closed in response to force from an opposite direction. In this way, the barrier 25 restricts air movement through the hood in at least one direction. Since the hood 24 is at an end of the tube 28, a distance between the one way barrier 25 and the sleeve 14 is adjustable. Since the sleeve 14 may be mounted to a wall, a distance between the one way barrier 25 and the wall is also adjustable.

Figure 2B:
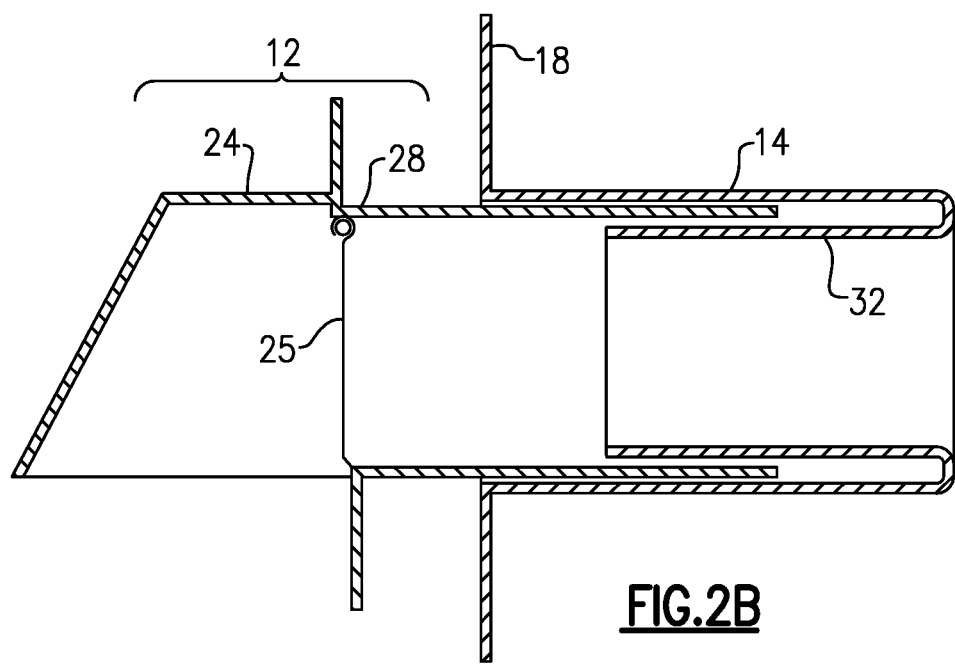
FIG. 2B is a cross-section of a vent according to a second embodiment.

Turning to FIG. 2B, according to another embodiment the sleeve 14 includes a cuff 32. The cuff 32 as illustrated is nearly tubular may be produced by drawing a free end of the sleeve 14 inwards, but other methods of production could produce an equally effective cuff 32. An external diameter of the cuff 32 at a free end is smaller than an internal diameter of the tube 28, which allows the cuff 32 to extend axially into and overlap the tube 28. The cuff 32 may optionally be sealed to the tube 28 by silicone or insulating tape.

The vent 10 described above can be manufactured with any of several known materials and forming processes. For example, the vent 10 may be constructed at least partially from sheet metal aluminum, polyvinyl chloride, or other suitable metals or polymers.

Figure 3A:
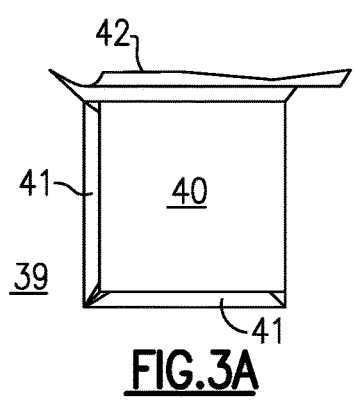
FIG. 3A illustrates a hole in a wall.

FIGS. 3A-3F show an exemplary installation process for the vent 10. As shown in FIG. 3A, a hole 40 may be provided in a wall 39. Walls 39 contemplated here include exterior walls 39 for buildings. In a specific example, the wall 39 may be sheathing in a home under construction. As shown, insulating housewrap 41, 42 wrapped on an exterior side of the wall 39 is cut and folded back from the hole 40. Side and bottom portions of the housewrap 41 may be folded into the hole 40 and secured, while a top portion of housewrap 42 may be left free.

Figure 3B:
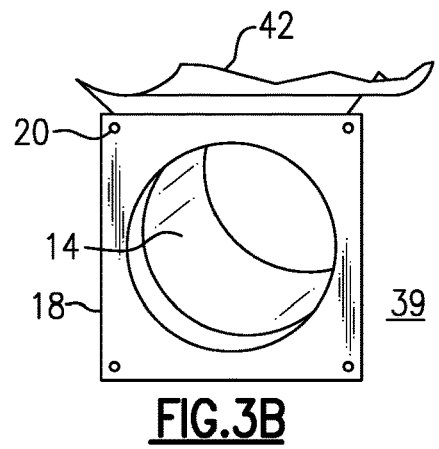
FIG. 3B illustrates a sleeve disposed through the hole.

FIG. 3B shows the sleeve 14 disposed through the hole 40. As shown, the sleeve 14 is disposed deep enough that the flange 18 is arranged against the exterior surface of the wall 39, and the sleeve 14 extends into an interior. At this stage, it is possible to anchor the flange 18 to the wall 39 using fasteners driven or screwed through the fastener holes 20. Further, anchoring the flange 18 with fasteners allows a worker to conform an installation of the vent 10 to predetermined measurements with relative accuracy and consistency.

Figure 3C:
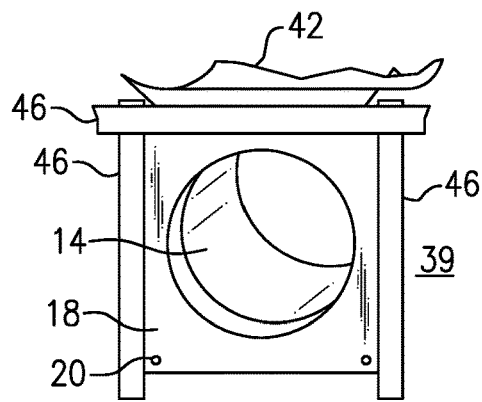
FIG. 3C illustrates the sleeve flashed to the wall.

After the sleeve 14 is disposed through the hole 40, the flange 18 can be sealed against the wall 39 using sealing strips 46, such as weather tape, as shown in FIG. 3C. The sealing strips 46 provide further securing and prevention of weather infiltration in addition to the anchoring with fasteners.

Figure 3D:
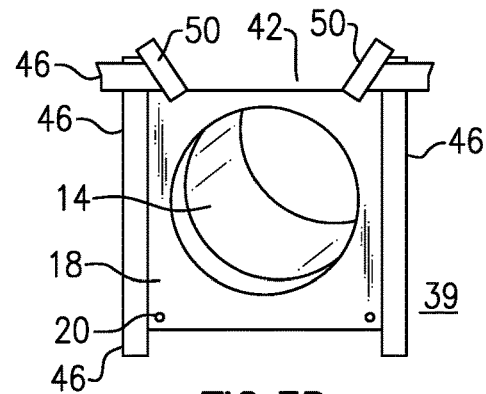
FIG. 3D illustrates housewrap sealed over the sleeve.

The top portion of housewrap 42, if left free when the hole 40 was provided, may be folded down to overlap the flange 18. The top portion of housewrap 42 can be secured and sealed with tape 50, as illustrated in FIG. 3D.

Figure 3E:
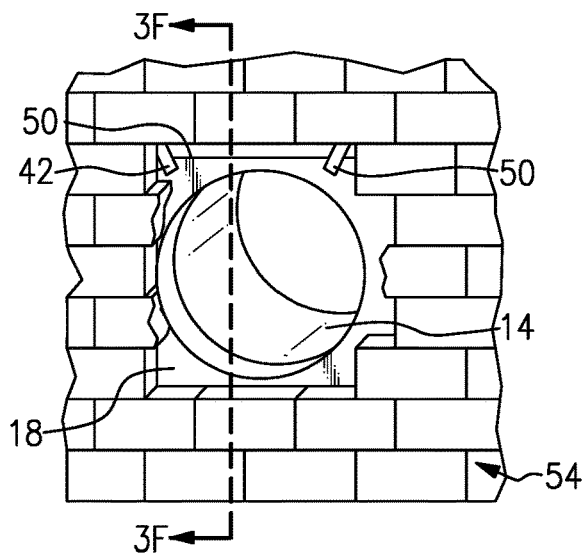
FIG. 3E illustrates a veneer constructed against the wall.

FIG. 3E shows a veneer 50 constructed against the exterior surface of the wall 39. According to the illustrated embodiment, the veneer 50 extends over and overlaps part of the flange 18, but leaves an opening into the sleeve clear. By overlapping the flange 18, the veneer 50 further prevents weather infiltration. The veneer 50 shown here is brick, but other veneer materials, such as vinyl, could be equally suitable and are expressly contemplated.

Figure 3F:
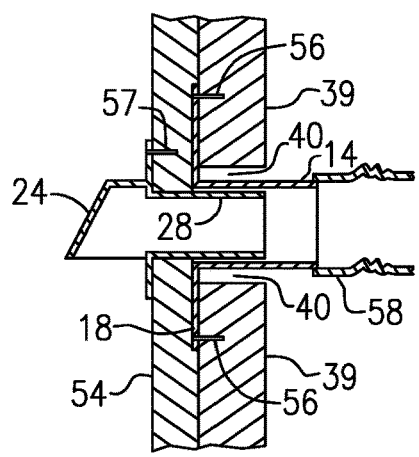
FIG. 3F is a cross-section of an installed vent along section 3F-3F.

FIG. 3F is a sectional view after the telescoping portion 12 has been inserted into the sleeve 14. The telescoping portion 12 is inserted far enough into the sleeve 14 such that a back side of the hood 24 abuts the veneer 54. As can be appreciated, fasteners 56 are driven through the flange 18 into the wall 39 to achieve anchoring. The hood 24 may be additionally secured by hood fasteners 57 driven through the hood 24 and into the veneer 54. The sleeve 14 extends into an interior space, and ductwork 58 in the interior space may be connected to the sleeve 14 as shown. In other embodiments, the tube 28 may be long enough to extend through the sleeve 14, and be connected to the ductwork 58 instead. The ductwork 58 could communicate to a clothes dryer, central ventilation, kitchen amenities, or any feature of a building that uses ventilation.

Figure 4:
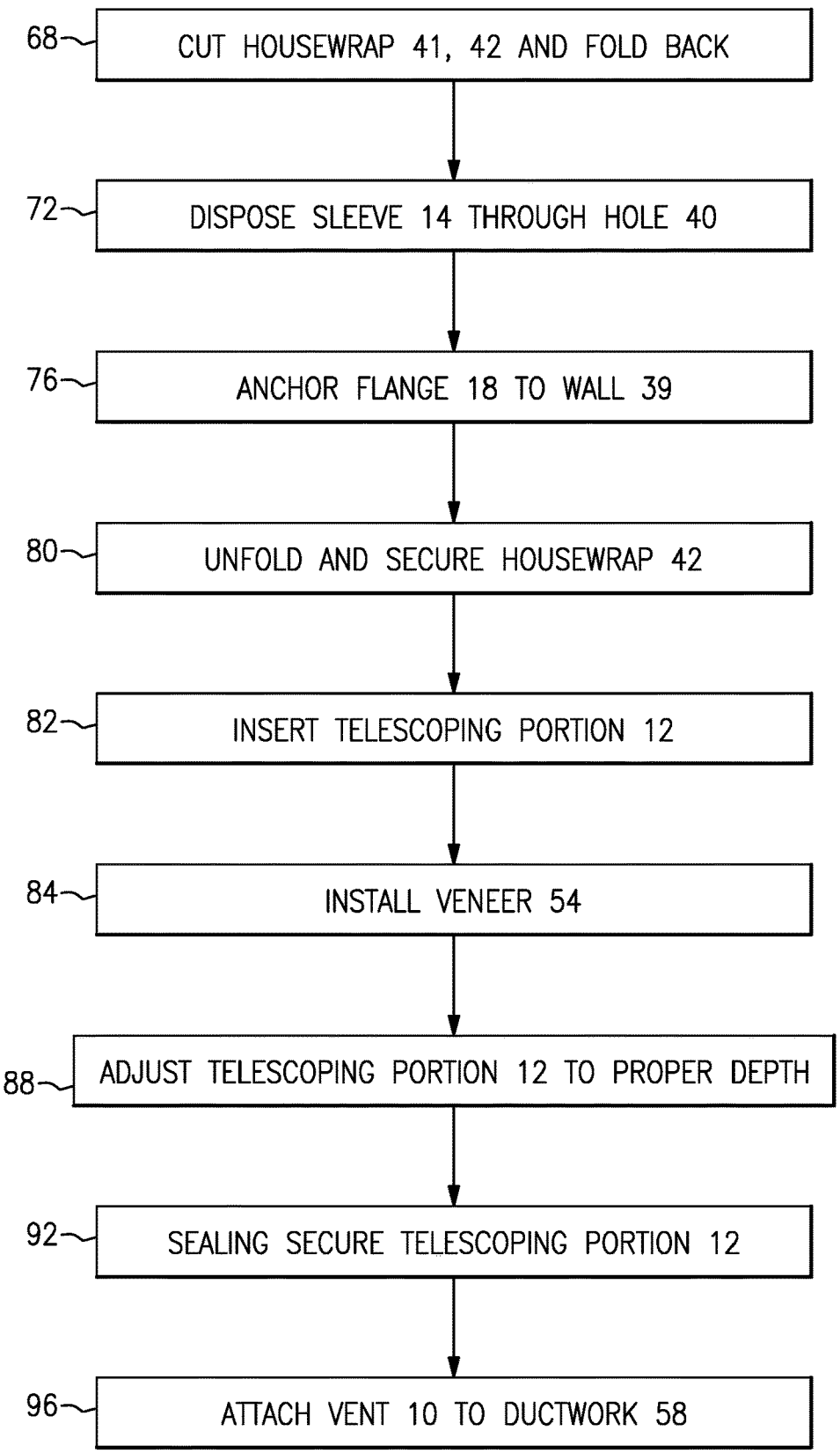
FIG. 4 shows a flowchart of a method of installing a vent according to an embodiment.

A summary of an installation process generally according to FIGS. 3A-3F is provided in FIG. 4. The housewrap 41, 42 is cut and folded back in step 68. In step 72, the sleeve 14 is disposed in the hole 40. Next, the flange 18 is anchored to the wall 39 in step 76. The top portion of the housewrap 42 is unfolded and secured in step 80. In step 82, the telescoping portion 12 is inserted into the sleeve 14. At step 82, the telescoping portion 12 will usually be left at a relatively shallow insertion to leave room for installing the veneer 54. The veneer 54 is installed against the exterior surface of the wall 39 in step 84. The telescoping portion 12 is slidingly adjusted to a final position. If step 88 follows step 84, the telescoping portion may be positioned such that a back side of the hood 24 abuts the veneer 54. After step 88, the telescoping portion 12 may be sealingly secured in step 92 using insulating tape or a bead of caulk. In step 96, the vent 10 is connected with ductwork 58. The ductwork 58 may be connected to or a part of an appliance, such as a clothes dryer, kitchen vent hood, make up air vents, or any other device or system that generates exhaust air.

It should be understood that the order and number of steps 60-96 shown in FIG. 4 and as described above is merely exemplary. For example, the vent 10 could be installed with fewer or different steps. Other orders of steps could also provide suitable installations without departing from the scope of the disclosure. For example, step 96 could be successfully performed before many of the other steps 60-92 without producing any problems in the resulting installation. In another example, step 80 could precede step 76.

Figure 5A:
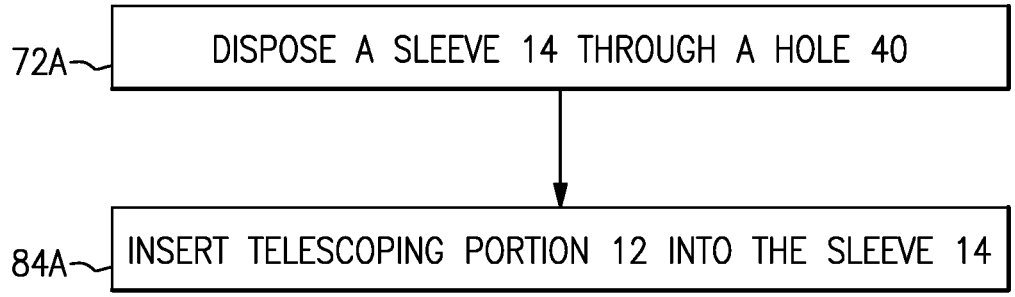
FIG. 5A shows a flowchart of a method of installing a vent according to another embodiment.
Figure 5B:
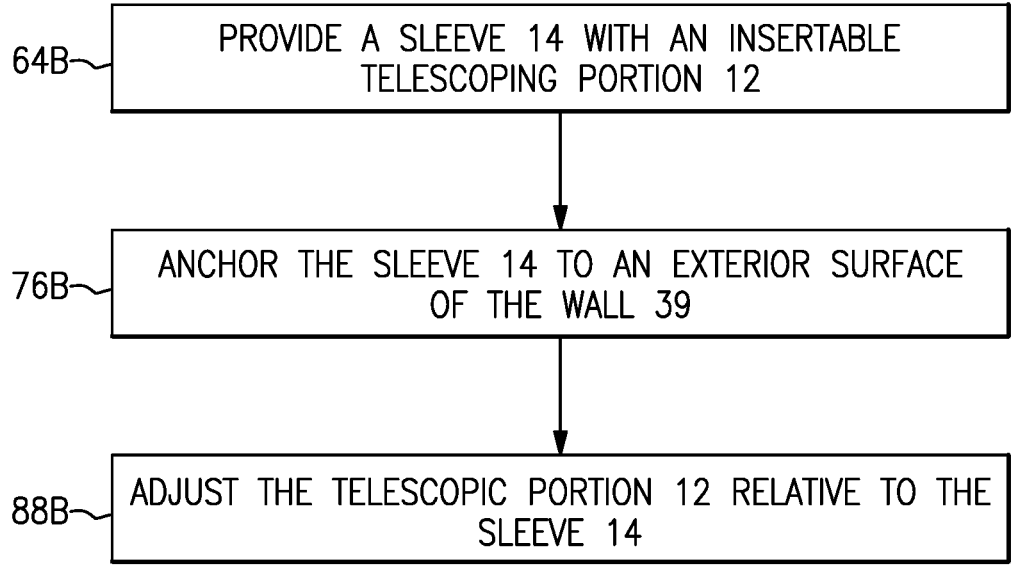
FIG. 5B shows a flowchart of a method of installing a vent according to another embodiment.

FIGS. 5A and 5B provide examples of installations of the vent 10 involving fewer steps than the method summarized in FIG. 4. It is again emphasized that the methods of FIGS. 5A and 5B are only exemplary, and several other processes of differing numbers or orders of steps would also be suitable for installing the vent 10. Foreseeable modifications to any of the methods illustrated in FIGS. 4 through 5B according to any specific application where the vent 10 may be installed, or according to any preference or convenience of an installer are expressly contemplated and should be considered within the scope of the disclosure.

In the method according to 5A, the sleeve 14 is disposed through the hole 40. The telescoping portion 12 is inserted into the sleeve 14 in step 84A.

In the method of FIG. 5B, a sleeve 14 is provided with a telescoping portion 12 in step 64B. The telescoping portion 12 may already be disposed within the sleeve 14 by step 64B. The sleeve 14 is anchored to a wall 39 such that the sleeve 14 extends through a hole in the wall in step 76B. In step 88B, the telescoping portion 12 is adjusted relative to the sleeve 14.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vent comprising:
a sleeve with a sleeve flange located nearer to a first end of the sleeve than an opposing second end of the sleeve flange, wherein the sleeve flange is secured to an outer side of a wall in an installed position; and
a tube having a receivable end that is receivable in the first end of the sleeve; a hood with a hood flange on an end opposite from the receivable end;
a cuff extending from the sleeve to overlap the tube;
wherein the tube fits within the sleeve to create an effectively continuous duct having an adjustable length that is configured to provide an adjustable distance between the sleeve flange and the hood flange to accommodate a veneer on the outer side of the wall, wherein the hood flange is configured to be spaced from the sleeve flange in the installed position,
a sealing arrangement selected from at least one of the following:
wherein the hood is sealed relative to the veneer in the installed position; and/or
wherein the sleeve is sealed relative to the tube in the installed position to prevent airflow from escaping between the sleeve and the tube; and
wherein the veneer is configured to be arranged between the hood and the flange in the installed position, such that the hood flange is secured to the veneer.

2. The vent of claim 1, wherein the tube is slideable relative to the sleeve.

3. The vent of claim 1, wherein the tube fits within the sleeve to establish a substantially continuous airway from the sleeve to the hood.

4. The vent of claim 1, wherein the hood has a barrier that restricts air movement through the hood in one direction.

5. A vent comprising:
a sleeve having a flange, wherein the flange is secured to an outer side of a wall in an installed position;
a telescoping portion including an exhaust hood with a hood flange, the telescoping portion receivable inside the sleeve to allow manual adjustment of a distance between the hood flange and the flange, wherein the hood flange is configured to be spaced from the flange in the installed position, and a veneer located on the outer side of the wall is arranged between the hood flange and the flange in the installed position, such that the hood flange is secured to the veneer
a cuff extending from a radially inner surface of the sleeve and overlapping a radially inner surface of the telescoping portion.

6. A method of installing a vent in a building comprising:
disposing a sleeve having a flange through a hole in a wall;
anchoring the flange to an exterior side of the wall;
installing a veneer at a side of the wall to which the flange is anchored; and
adjusting a distance that a telescoping portion received within the sleeve extends from the flange, wherein a hood and a hood flange is provided on the telescoping portion, the veneer arranged between the hood flange and the flange which are spaced apart the distance, such that the hood flange is secured to the veneer
sealing the vent using at least one of the following:
wherein the hood flange is sealed relative to the veneer in the installed position; and/or
wherein the sleeve is sealed relative to the telescoping portion in the installed position to prevent airflow from escaping between the sleeve and the telescoping portion;
slidingly adjusting the telescoping portion relative to the sleeve to overcome an interference fit between the telescoping portion and the sleeve, wherein the sealing is performed using the interference fit provided between the telescoping portion and the sleeve.

7. The method of claim 6, wherein the installing the veneer is accomplished such that the veneer overlaps at least part of the flange.

8. The method of claim 6, wherein the installing the veneer is laying brick.

9. The method of claim 6, wherein the slidingly adjusting the telescoping portion relative to the sleeve includes inserting the telescoping portion into a flange end of the sleeve.

10. The method of claim 6, further comprising inserting the telescoping portion into a flange end of the sleeve before installing the veneer.

11. The method of claim 6, further comprising:
cutting and folding back insulation from around the hole before disposing the sleeve through the hole; and
unfolding the insulation after anchoring the flange to the wall such that at least part of the insulation overlaps the flange.

\* \* \* \* \*